United States Patent [19]
Devlin

[11] 3,840,153
[45] Oct. 8, 1974

[54] DRINKING UTENSIL
[75] Inventor: Edward J. Devlin, Madison, Conn.
[73] Assignee: Glacier, Incorporated, Clinton, N.J.
[22] Filed: Dec. 26, 1972
[21] Appl. No.: 318,111

[52] U.S. Cl............ 222/146 C, 222/180, 222/211, 222/531, 222/536, 224/32
[51] Int. Cl............................................. B67d 5/62
[58] Field of Search........ 222/146 C, 180, 211, 212, 222/213, 215, 533, 534, 536, 531, 532; 248/311; 224/30, 32, 39

[56] References Cited
UNITED STATES PATENTS

| | | | |
|---|---|---|---|
| 2,080,957 | 5/1937 | Barnett | 248/311 |
| 2,514,773 | 7/1950 | Kromer | 222/146 C |
| 2,625,304 | 1/1953 | Mart | 222/212 X |
| 2,930,514 | 3/1960 | Pacey | 222/533 X |
| 3,443,726 | 5/1969 | Muller et al. | 222/531 X |

FOREIGN PATENTS OR APPLICATIONS

| | | | |
|---|---|---|---|
| 104,031 | 6/1938 | Great Britain | 222/146 C |

Primary Examiner—Robert B. Reeves
Assistant Examiner—Joseph J. Rolla
Attorney, Agent, or Firm—Fitch, Even, Tabin & Luedeka

[57] ABSTRACT

A drinking utensil includes a container having flexible walls and a conduit extending into the container. A valve is applied to the conduit to control the flow of a beverage which is dispensed when a pressure is applied to the flexible walls of the container. A capsule that contains a refrigerant is insertable in the container to keep the liquid contents of the container cool. The capsule is removable from the utensil for freezing the refrigerant.

4 Claims, 4 Drawing Figures

PATENTED OCT 8 1974
3,840,153
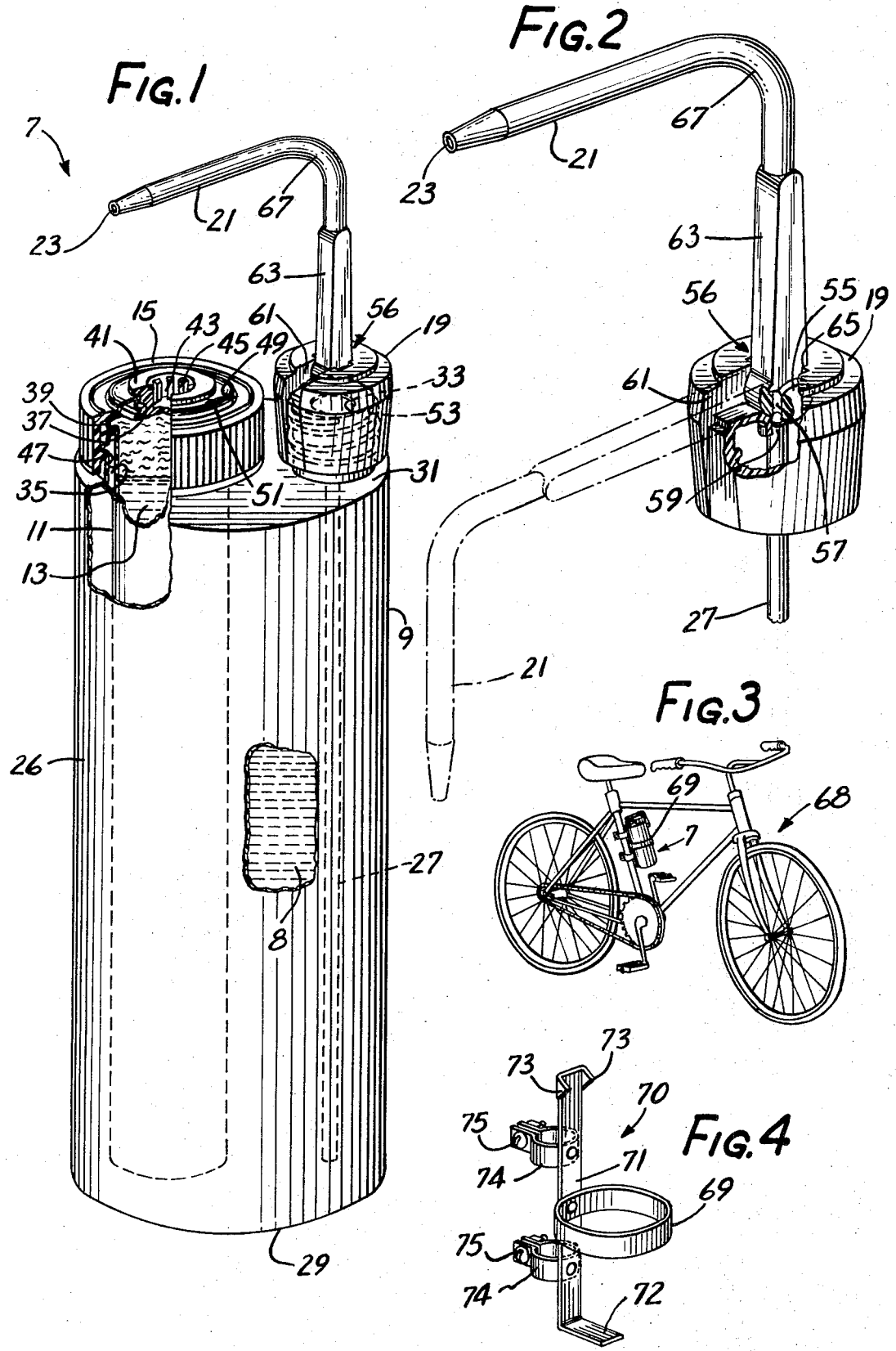

DRINKING UTENSIL

The present invention relates generally to drinking utensils, and more particularly, relates to drinking utensils for directly dispensing a beverage from the utensil to the consumer under positive flow conditions.

Direct dispensing drinking utensils conventionally are provided with a flexible body which may be deformed to produce a liquid jet stream of a beverage contained in the utensil. The beverage is consumed from such utensils by squeezing the body of the utensil and directing the resulting stream of beverage directly into the mouth of the consumer. Generally, such direct dispensing drinking utensils have found applications in certain types of situations requiring the rapid dispensing of limited amounts of beverage to a number of different persons. For example, the restricted amount of liquid required by athletic teams may be quickly provided to a number of team members or participants during the course of a game by such direct dispensing drinking utensils.

However, the limitations of conventional deformable direct dispensing drinking utensils have generally restricted the use of such utensils, and such utensils have not conventionally been developed to provide features which would result in the general acceptance and use of such utensils by the consuming public.

It is a primary object of the present invention to provide an improved beverage container affording controlled dispensing of liquid refreshment directly to the consumer.

A more particular object of the present invention is to provide a beverage container of the aforementioned type which not only affords controlled dispensing of liquid refreshment but also provides for refrigeration of the contained liquid refreshment over extended periods of time.

Other objects and advantages of the present invention will become apparent from the following description and the drawing, in which FIG. 1 is a perspective view of a utensil constructed in accordance with the principles of the present invention, with portions of the utensil being broken away to more clearly illustrate certain features thereof;

FIG. 2 is a fragmentary view of a portion of the embodiment of FIG. 1 particularly illustrating means for opening and closing the tube through which liquid is dispensed;

FIG. 3 is a perspective view of the utensil of FIG. 1 in combination with a vehicle, such as a bicycle; and FIG. 4 is a perspective view of a holder for use in the combination of FIG. 3.

Generally, the present invention is directed to a drinking utensil for enabling a refrigerated beverage contained therein to be controllably dispensed under pressure from the container directly to the consumer. The utensil comprises a resiliently flexible outer body for containing the beverage to be dispensed, conduit means extending through the flexible outer body in hermetically sealed relation thereto, and a permanently hermetically sealed refrigerant capsule removably engageable in hermetically sealable relationship with said flexible outer body to project internally of said flexible outer body to reside in the beverage containing zone defined by the outer body and in heat exchange relationship with a beverage container therein. The refrigerant capsule is constructed of a resiliently flexible plastic material and contains a refreezable aqueous refrigerant liquid having a freezing point below the freezing point of water. Generally, in order to provide functional advantages of the present invention with respect to controlled beverage refrigeration, the ratio of the volume of the refreezable refrigerant in the refrigerant capsule to the volume of beverage containing zone defined by the outer body should be from about 0.15 to 1 and about 0.4 to 1, and preferably about 0.25 to 1. The beverage containing capacity of the outer body will generally be from about 8 fluid ounces to about 16 fluid ounces, but may be as large as about 32 fluid ounces. In this connection, it is also generally advantageous that the wall thickness of the refrigerant capsule intended to be located in heat exchange relationship with the beverage be between about 0.03 cm and about 0.2 cm. The refrigerant capsule is an important element in the present invention and in combination with the other elements provides an improved direct dispensing drinking utensil, which is self contained and portable, and which is adapted for beverage cooling and/or prolonged provision of the beverage in a portable refrigerated condition. The capsule is conveniently removable from the outer body so that the refrigerant contained therein may be frozen, as by placing the capsule in the freezer compartment of a conventional household refrigerator. After having been frozen, the capsule may then be reinserted into the outer body for use with the beverage.

As indicated, the drinking utensil includes a conduit means extending through the flexible outer body for conducting the beverage. The conduit means should be engageable in fluid tight relationship with the outer body, but may be removably engageable as, for example, to facilitate the cleaning of the utensil. The portion of the conduit means located interiorly of the outer body extends from the point of passage through the body, into the beverage zone within the body, and should best extend to a point adjacent the bottom of the beverage zone to permit substantially complete dispensing of the beverage from the utensil. The portion of the conduit means located externally of the flexible body projects therefrom to provide an external orifice suitably directed for the dispensing of a beverage jetstream issuing therefrom to the consumer. The conduit means adantageously includes a selectively operable valve means for controlling the flow of beverage through the conduit means.

Accordingly, with the fluid tight seal between the outer body and the refrigerant capsule and the conduit means, respectively, with the valve means is closed position the utensil will be substantially fluid tight to contain the beverage therein without leaking or spilling. With the valve means in open position, the flexible outer body of the utensil may be inwardly deformed to create an internal pressure that will controllably dispense a jetstream of the suitably refrigerated beverage to the consumer.

In the embodiment illustrated in the FIGS. 1–4, a drinking utensil 7 includes a vessel or container 9 to hold a liquid refreshment 8. The container is generally in the form of a cylinder. The top end of the container 9 has provision for the insertion of an inner receptacle which serves as a refrigerating core or capsule 11. The capsule 11 contains a suitable refrigerant 15 which is preferably a non-toxic, non-volatile aqueous mixture or solution having a freezing point substantially below 32° F.

The capsule 11 is generally tubular in form and is held in a secure position by a closure member or cap 15. The capsule 11 is easily removed and may be placed in a freezing compartment of a conventional refrigerator for the freezing of its contents. The capsule 11 may be refrozen and reused repeatedly with subsequent changes of beverage in the utensil. After having been frozen, the capsule is inserted in the container 9 and its position retained by application of the cap 15. The capsule 11 should best be of a length sufficient to extend from its point of insertion at the top end of the container 9 to a point adjacent the bottom of the container 9.

The container 9 is conveniently formed of a suitably tough, resiliently flexible material, such as polyethylene. The material should have a suitable flexural modulus of elasticity, such as from about $0.08 \times 10^5$ psi. to about $2 \times 10^5$ psi., and should be sufficiently tough to provide adequate fatique endurance for the repeated deformation encountered during use. The wall thickness preferably is thick enough to provide sufficient strength and heat retaining insulating characteristics, but not so thick as to interfere with the deflecting of the body wall. Accordingly, it is advantageous that the thickness be between about 0.03 cm and about 0.2 cm.

A second closure member or cap 19 is provided for the dispensing of the liquid refreshment 8 from the container 9. The cap 19 is provided with a dispensing tube or spout 21 which dispenses the liquid from its discharge end 23. As will be described in detail hereinafter, the dispensing tube 21 provides for a directed discharge of a liquid refreshment contained in the container 9 directly into the mouth of a consumer. Further, the dispensing tube 21 is mounted on the cap 19 in such a manner as to provide the action of a shutoff valve. A tubular conduit 27 depends from the cap 19 and extends into the liquid 8 to a point near the bottom of the container. The entire assembly provides conduit means for the dispensing of the liquid from the container.

The drinking utensil 7 generally provides a means for dispensing a readily controlled, limited amount of the liquid 8 in an outwardly directed path at the instance of a squeeze on the sidewalls of the container 9. The capsule 11 serves as a cooling core for the drinking utensil 7 and keeps the liquid 8 cool for an extended period of time. The dispensing portion of the drinking utensil 7 may be shutoff or closed by folding the tube 21 downwardly against the container 9, which action also provides compactness of the utensil.

More specifically, the container 9 is generally cylindrical and includes a cylindrical wall 26, an integral bottom wall 29 without openings, and an integral top wall 31 in which are openings 33 for passage of the liquid 8 and an opening 35 for receiving the insertable capsule 11. Other than these openings, the container 9 is completely closed and is in the form of a "squeeze" type bottle. The deformation of the container 9 to produce the beverage stream is achieved by applying hand pressure to the cylindrical wall 26. Release of the pressure permits the resiliently elastic container to resume its original shape accompanied by the introduction of air to permit a subsequent discharge cycle. Thus in the illustrated embodiment, the cylindrical wall 26 is flexible to deform by yielding to the externally applied pressure and is resilient to recover its shape quickly after the deforming force is removed. The container 10 may be conveniently formed of a suitably tough plastic material, such as polyethylene. Other flexible plastic materials such as polypropylene also may be suitable for the container.

The insertable receptacle or capsule 11 may be of the same or similar material as the container 9. The capsule 11 is generally tubular and is initially completely closed except for an opening 37 in one end. Preferably, the opening 37 is in the proximal or mounting end of the capsule 11. A flange 39 encircles the mounting end of the capsule 11 and provides a support for the capsule in the container 9 and a seal for the capsule in the opening 37 upon the application of the cap 15. Preferably, the flange 39 is an integral part of the capsule body. A closure member or plug 41 is used to permanently close the opening 37 in the capsule 11 after introduction of the refreezable refrigerant liquid. This plug 41 is provided with a recess 43 and a ribbed wall 45 surrounding the recess. Thus, a socket is formed in the closure member 41 by which a gripping relation may be obtained on the member to close the opening 37 in the end of the capsule. The recess 43 thus provides for an essentially flat end on the capsule 11 when the closure member 41 is applied to the capsule. After the capsule is initially filled with a refrigerant, a type of which is hereinafter described, the capsule is hermetically sealed as by spin welding the plug 41 into the opening 37 in a manner well known in the art.

The capsule 11 is filled with a suitable refrigerant 13 which, as mentioned previously, is preferably a non-toxic, non-volatile aqueous mixture or solution having a freezing point below 32° F. Preferably the refrigerant will have a freezing point of from about 15° F. to about 25° F. Once the plug 41 has been applied hermetically to seal the opening 37 in the capsule, the capsule is placed in the freezing compartment of a conventional refrigerator and its contents allowed to freeze. The capsule 11 is then inserted in the container 9 through the opening 35, which is surrounded by an essentially cylindrical wall 47 threaded on its outer surface, and extending outwardly of the top wall 31. The flange 39 lies across at least a portion of the open end of the threaded cylindrical extension, and the outer diameter of the flange is preferably less than the outer diameter of the cylindrical extension wall 47. Thus when the cap 15 is applied to the cylindrical extension wall 47, it secures the capsule 11 and seals the opening 37.

The drinking utensil 7 may contain a soft drink or carbonated beverage, and as a convenience, the illustrated container is provided with a capacity of 16 fluid ounces, equal to the capacity of the typical "king" size commercial beverage container. In accordance with the foregoing description, the capsule 11 preferably has a volume which, when inserted in the container 9, displaces four fluid ounces. Thus, the drinking utensil 7 with the refrigerating core will have a capacity of 12 fluid ounces, and the contents may be kept cool for an extended period of time.

Because an aqueous refrigerant expands slightly upon freezing, the capsule 11 is not completely filled with refrigerant, leaving space for the expansion in a direction that does not cause an overdistension of the capsule walls. In this regard, although various types of aqueous refrigerants might be used, such as aqueous gels or aqueous solutions of polyols such as ethylene glycol and/or propylene glycol, a refrigerant which is particularly advantageous for use in the present invention comprises an aqueous solution of urea having a freezing point of between about 17° and about 25° F. The urea solution may preferably also contain a small amount of crystal slip agent such as propylene glycol. Preferably the urea and propylene glycol if employed are in specific proportions and may include minor amounts of preservatives, colorants, algicides and bactericides as desired. More particularly, the preferred aqueous refrigerant comprises an aqueous solution of from about 15 to 20 percent urea by weight based on the weight of the refrigerant solution, and from about 0.5 to about 3 percent by weight based on the weight of the solution of a crystal slip agent, such as propylene glycol.

The urea and the propylene glycol dissolve readily in water, which essentially makes up the remainder of the refrigerant solution. The solution thus acquires a lower freezing point. The use of urea as the principal freezing point depressant in the preferred aqueous refrigerant solution has the advantage of providing a refrigerant which will not readily support bacterial growth.

The propylene glycol serves as a crystal slip agent which enables the refrigerant to conform more readily to the confines of the capsule 11 without distending the walls of the capsule. A urea refrigerant solution without a crystal slip agent has a tendency to freeze into a solid mass of joined or interlocking crystals that rigidly expand as the refrigerant freezes. Such rigid expansion within the container may exert undesirable pressure or forces on the walls which would deform the shape of the walls and possibly prevent the insertion of the capsule 11 into the container 9 through the opening 35. The crystal slip agent, on the other hand, permits individual crystals to form and to remain movable with respect to one another rather than all joining or interlocking together into a rigid mass, particularly during the early stages of freezing.

As indicated hereinabove, refrigerant solutions or gels other than that described above may also be used.

The disposition of the capsule 11 when inserted in the container 9 is such that the liquid 8 in the container 9 completely surrounds as much of the capsule 11 as is submerged in the liquid. Thus, if the container 9 is filled to capacity with the liquid 8, essentially all of the heat absorbed by the capsule 11 will be extracted from the liquid and provide efficient cooling of the liquid. Thus, the latent heat of fusion comes almost entirely from the liquid, with little or none coming from the ambient atmosphere of the utensil 7.

In the illustrated embodiment, the cap 15 has a hole 49 in its planar portion. The hole 49 is sufficiently large to afford a rim 51, or a decorative portion equivalent thereto, on the top surface of the capsule 11. Alternatively, the cap 15 may have a solid planar body portion (not shown), and such could be useful where the refrigerating core or capsule 11 is not inserted in the container 9 and the drinking utensil is used to its full capacity of 16 ounces without the refrigerant. Such an alternative cap 15 would then completely close the opening 35 in the container 9.

As mentioned previously, the opening 33 in the top wall 31 of the container 9 provides for the passage of liquid, both in and out of the container 9. The opening 33 is also surrounded by an integral cylindrical wall 53 extending outwardly of the top wall 31 of the container 9 and having threads on its outer surface. The cap 19 has complementary threads on its inner cylindrical wall. Thus the two sets of threads interlock with one another to retain the cap 19 in a fast condition when the cap is turned on the cylindrical extension. The cap 19 has provisions for the dispensing tube 21, which is pivotally attached by a pin 55 to provide a valve assembly 56 at an intake 57 of the dispensing tube 21. The cap 19 has a centrally disposed port 59 adjacent the intake 57. A radial slot 61, preferably square in cross-section, is provided in the top of the cap 19 to receive a stem portion 63 of the dispensing tube 21 when the dispensing tube is rotated to a position adjacent the container 9. This rotation creates a valve action whereby the valve assembly 56 may be used to control the flow of the liquid 8 through the dispensing tube. Thus, if the dispensing tube 21 is rotated so that the stem 63 and the intake 57 are axially aligned and in communication with the port 59 of the cap 19, the valve is open and liquid may flow through. On the other hand, when the dispensing tube 21 is rotated to an alternative position so that the stem 63 lies within the slot 61 of the cap 19 as shown in phantom in FIG. 2, the intake 57 is adjacent a wall portion 65 of the cap 19, and the port 59 is effectively blocked by a portion of the wall of the stem 63 so that the flow of liquid is shut off.

The dispensing tube is preferably of a plastic material, such as polyethylene, and is square in cross section to fit within the slot 61 when closed. The pin 55 may be an integral part of the stem 61 at its base end and comprise round protuberances that are captured within complementary recesses (not specifically shown) in the cap 19. The related parts are dimensioned to provide an interference fit between the stem 63 and the slot 61 of the cap 19. Thus this assembly becomes an effective valve to either permit the flow of fluid therethrough or to completely restrict the flow and seal the port 59 and the opening 33.

The dispensing tube 21 has a straw-like configuration and includes a bend as at 67, which preferably is at an angle of about 90°, to further direct the dispensing of liquid in a direction generally transverse to that of the axis of the container. Thus, the bend enables the user to hold the utensil upright near his mouth to direct the discharge into his mouth, and it further affords a compact collapsed configuration of the utensil by enabling the tube 21 to lie against the container when the valve 56 is closed.

To operate the utensil 7, the user need only lift the tube 21 to open the valve 56, hold the utensil upright in the vicinity of his mouth, squeeze the cylinder wall 26 of the container 9 and receive a directed flow of a beverage 8 into his mouth. Since the liquid is dispensed as a result of the pressure created by the squeeze, its flow is limited thereby. Thus, the quantity of the dispensed liquid is controlled, and a user, such as an athlete, does not overindulge in a liquid refreshment. This aspect may be of importance in avoiding gastric upset or disturbance when the user is engaged in a strenuous physical activity.

If the liquid 25 is a carbonated beverage, which children may desire, the sealing action of the valve assembly 56 and the depending conduit 27 are effective in preventing the escape of $CO_2$ that accumulates in the space of the container above the liquid level. As pressure builds up within the container, however, it will assist the discharge flow of liquid through the conduit 27 and the dispensing tube 21 and will supplement the squeeze of the container 9 to cause discharge of the liquid.

When the refrigerating core or capsule 11 has been frozen and inserted in the container 9 that already has been filled with a liquid refreshment 8, the drinking utensil 7 becomes a convenient means of carrying a supply of cooled liquid refreshment dispensible in controlled amounts. The utensil 7 is rugged and, of course, portable and may be carried by many known means. One such means is illustrated in FIGS. 3 and 4 where the utensil 7 is carried on a vehicle, such as a bicycle 68 or motorcycle. A girdle 69 encircles the utensil 7 and restricts it to a holder 70 having a body 71, at one end of which is a foot 72 and at the opposite end of which are ears 73. The utensil 7 is retained in the holder by the girdle 69, the foot 72 and the ears 73. Preferably, the girdle 69 has an elastic characteristic which will snugly encircle the utensil and yet afford its removal and replacement with relative ease by guiding the utensil past the ears 73 into and out of the girdle 69. Alternatively, the girdle could be of a nonelastic material, such as metal, and be dimmensioned with a diameter slightly larger than the diameter of the utensil 7. The girdle may be attached to the body 71 in any conventional manner. A pair of clamps 74 are attached to the body 71 on its opposite side, which attachment may also be in any conventional manner, for attaching the holder 70 to a convenient portion of the frame of the bicycle 68. The clamps 74 may be tightened around this portion of the vehicle frame by any suitable means, such as by captured screws 75. The holder body, foot, ears and clamps preferably are of any suitable metal. Thus the rider of the vehicle is provided with a source of beverage that can be cooled and dispensed even while the user is riding the bicycle.

Summarizing, there has been provided a drinking utensil 7 that affords controlled dispensing of a liquid refreshment and provides for the refrigerating of the contained liquid refreshment over extended periods of time. The combination that makes up the illustrated drinking utensil 7 has several advantages. For example, a refrigerating core is provided which contains a refrigerant, can be sealed, and can be inserted in the utensil and removed and placed in a conventional freezer for freezing and then re-inserted in the drinking utensil 7 to effectively refrigerate the liquid refreshment contained in the utensil. When inserted in the utensil the liquid surrounds the submerged portion of the cooling core. The liquid refreshment is dispensible in controlled amounts that are easily directed to a user's mouth without touching the mouth, from a straw-like dispensing tube. The dispensing tube in combination with the cap on which it is mounted provides a valve assembly that can completely shut off the flow of liquid and seal the dispensing conduit. The configuration of the discharge tube includes bend in the length of the tube, and the whole tube folds against the body of the container when not in use. If a carbonated beverage is contained in the utensil 7 with the refrigerating core added, the core inhibits carbonation and thereby preserves the $CO_2$ in the beverage. The illustrated utensil 7 with the cooling core inserted will accommodate the contents of a commercial 12 ounce beverage can, while without the cooling core, the contents of a king size 16 ounce beverage can.

This illustrated combination provides many advantageous uses for the utensil. For example, a sanitary drinking utensil results which dispenses liquid refreshment to the consumer's mouth without any part of the utensil touching the consumer's lips. The utensil can be passed around from person to person. A simple flip of the spout 21 closes the utensil, and it can be tossed around without spilling its liquid contents. Accordingly, it is useful for athletic events, bicycling, motorcycling, hiking, golfing, skating, tennis, picnics, beach outings, automobile rides, around the house, boating, fishing, hunting, and even skiing. Any beverage that will not clog the spout may be contained in the utensil.

While the invention has been described in connection with a preferred embodiment, many alternatives, modifications, and variations may be apparent to those skilled in the art in view of the foregoing description. Accordingly it is intended to embrace all such alternatives, modifications, and variations as fall within the spirit and scope of the appended claims.

Various features of the invention are set forth in the following claims.

What is claimed is:

1. A drinking utensil enabling a refrigerated beverage contained therein to be controllably dispensed under pressure therefrom, comprising a container having resiliently flexible walls, conduit means extending through one of the container walls for conducting the beverage, and valve means on said conduit means for controlling the flow of beverage therethrough, said valve means being in the form of a port and a dispensing tube pivotally attached adjacent said port, said dispensing tube capable of being pivotally rotated in a plane lying axially of said container to a position where said port and said tube are in communication with one another and alternatively to a position where said port is blocked by the wall of said tube, said dispensing tube including a bend in its length enabling the tube to lie against the walls of said container when said tube is rotated to said alternative position, thereby affording a directed discharge at an angle to the axis of said container when said port and said tube are in communication with one another and a compact collapsed configuration of the utensil when said tube is rotated to said alternative position; said utensil further comprising a capsule removably inserted in said container in heat exchange relation with the contained beverage, said capsule containing a non-toxic, non-volatile, aqueous solution having a freezing point below the freezing point of water and said capsule being removable from said utensil for the freezing of said solution.

2. The utensil in accordance with claim 1 wherein said conduit means extends inwardly of said container substantially to the wall of said container opposite the wall through which said conduit means enters said container.

3. The utensil in accordance with claim 1 wherein said container, conduit means, and valve means are of polyethylene.

4. The utensil in accordance with claim 1 further including the combination of a holder for attaching the utensil to a vehicle, said holder having a girdle encircling the utensil and ears and a foot retaining the utensil within the girdle, said holder further including clamp means for attaching the combination of holder and utensil to the frame of the vehicle.

* * * * *